United States Patent
Abali et al.

(10) Patent No.: US 6,297,729 B1
(45) Date of Patent: Oct. 2, 2001

(54) METHOD AND APPARATUS FOR SECURING COMMUNICATIONS ALONG AC POWER LINES

(75) Inventors: Bulent Abali, New York; Hubertus Franke, Cortlandt Manor; Mark E. Giampapa, Irvington; Pratap C. Pattnaik, Ossining, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/280,961

(22) Filed: Mar. 29, 1999

(51) Int. Cl.$^7$ .................................................. H04M 11/04
(52) U.S. Cl. ............................. 340/310.01; 340/310.03; 340/310.07
(58) Field of Search ........................ 340/310.01, 310.02, 340/310.03, 310.07

(56) References Cited

U.S. PATENT DOCUMENTS

| | | |
|---|---|---|
| 4,398,178 | 8/1983 | Russ et al. . |
| 4,429,299 | 1/1984 | Kabat et al. . |
| 5,365,154 | 11/1994 | Schneider et al. . |
| 5,684,450 | 11/1997 | Brown . |
| 5,777,544 * | 7/1998 | Vander Mey et al. .......... 340/310.01 |
| 5,777,769 * | 7/1998 | Coutinho ......................... 340/310.01 |
| 5,805,053 | 9/1998 | Patel et al. . |
| 5,929,748 * | 7/1999 | Odinak ............................. 340/310.01 |
| 5,952,914 * | 9/1999 | Wynn ............................... 340/310.01 |
| 6,091,320 * | 7/2000 | Odinak ............................. 340/310.01 |

* cited by examiner

Primary Examiner—Edward Lefkowitz
(74) Attorney, Agent, or Firm—F. Chau & Associates, LLP

(57) ABSTRACT

A power line communications system including a power line for supplying ac power; a power source connected to the power line at one end; and a communications network having a plurality of devices, the devices connected to the power line at another end for (a) receiving ac power and (b) communicating information. The system also includes a security firewall coupled between the one end and the other end of the power line for securing the communications information. The security firewall passes the ac power without attenuation, but blocks the communications information from passing. The security firewall also prevents passage of interference to the communications network. In this manner a secure and interference-free communications network is established.

14 Claims, 5 Drawing Sheets

METHOD AND APPARATUS FOR SECURING COMMUNICATIONS ALONG AC POWER LINES

TECHNICAL FIELD

The present invention relates, in general, to networked devices communicating information along ac power lines of a building and, in particular, to a method and apparatus for securing the communications from external interference and unauthorized detection along the ac power lines.

BACKGROUND OF THE INVENTION

Embedded computer controller systems are becoming increasingly prevalent in a variety of household and office devices. These devices include appliances, speech communications systems, environmental control systems, security monitoring systems and more. For these embedded controllers to be useful, they must communicate with each other and, with a centralized control and monitoring system operated by a human user. One possible communications medium is the electrical wiring that already exists within these buildings.

The prior art describes devices for achieving bi-directional communications between intelligent systems using the electrical power distribution wires contained in homes or office buildings. The prior art also describes methods of enhancing the communications by filtering noise caused by transient electrical surges or power spikes that interfere with the quality of communications, in both analog and digital devices.

In U.S. Pat. No. 5,805,053, issued Sep. 8, 1998, and incorporated herein by reference, C. H. Patel et al., describe an appliance adapted to transmit and receive information signals using the same electrical wiring that power the appliance. In U.S. Pat. No. 4,398,178, issued Aug. 9, 1983, and incorporated herein by reference, A. Russ et al. describe another method for achieving communications between devices by using power lines.

In U.S. Pat. No. 5,684,450, issued Nov. 4, 1997, and incorporated herein by reference, P. A. Brown, describes a method and apparatus for using the lines of a power transmission network to transmit and receive voice and digital data to and from remote locations. Brown suggests using available frequency bands between 1 MHz and 60 MHz. Brown also suggests that reliable analog and digital communications of wide bandwidth may be achieved along long distances using internal and external electrical lines of a building.

There are drawbacks, however, in communicating along existing power lines. Power lines as a communications medium lack security and privacy. All buildings, including houses and offices, are connected to a local electric utility and are, consequently, directly connected (i.e., dotted) together. Furthermore, all rooms within a house, apartment building, or office building are also directly connected together. This poses several problems. First, communications between devices may be monitored or intercepted by unauthorized users. Second, one device may interfere with another device, either intentionally or unintentionally. Third, the amount of communications traffic may overwhelm the bandwidth available along the electrical wiring. The prior art has attempted to eliminate some of these problems by encoding or encrypting communications between devices. These solutions, however, increase cost and complexity of the device, and do not address the bandwidth problem.

In U.S. Pat. No. 5,365,154, issued Nov. 15, 1994, and incorporated herein by reference, J. K. Schneider et al. describe a device for communicating along power transmission lines. The described device includes a means for applying an identification code to the device, so that the device may be controlled individually from a central location. By including address information with the control and data information, each device or a group of devices may selectively respond. Adding address information to the data, however, is an inadequate solution to achieving security and privacy in communications. First, cooperation between devices is necessary by selecting a unique address from a group of addresses to identify a particular device. Second, all data information sent along the power lines is detectable by other devices beyond the intended device or group of devices. Third, the data information is subject to interference from another device that is also communicating along the same power lines.

In U.S. Pat. No. 4,429,299, issued Jan. 31, 1984, and incorporated herein by reference, J. M. Kabat et al., describe a two-way power line communications system, shown as FIG. 1 in the patent and reproduced herein as FIG. 1. Referring now to FIG. 1, there is shown a room status indication system, designated generally as 16, which uses existing power lines for communications. The heart of the system is processor 10. The processor is coupled to several data terminals, one of which is designated as 12, a status board 14, and a general purpose interface 24. The processor is capable of communicating with each room in a building or a building complex that is equipped with a room control unit. Three such rooms are shown and generally designated as 18, 20 and 22. As represented by room 20, each room control unit includes receiver 26 and transmitter 28. Receiver 26 accepts and decodes interrogation and data signals from processor 10, and transmitter 28 encodes and sends return signals to processor 10. Each room control unit is capable of monitoring various conditions within the room. The room control unit is arranged to monitor room status, the condition of a smoke detector device, or any other activity that is capable of being initiated upon closure of a switch, such as activating a wake up message or providing a message waiting indication.

Each room control unit is equipped with circuitry for receiving from the processing unit an interrogation signal that includes data and address codes. The room control unit compares the address code with a pre-selected address code programmed into the unit. If the address code matches the pre-selected address, the room control unit performs an instructed command and responds appropriately. While the system described by Kabat et al. may function properly within a cooperating network, the system is susceptible to interference from non-cooperating systems that operate outside of the network. Any non-cooperating system that has access to the power lines is capable of detecting the signals being sent along the power lines. The non-cooperating system may also cause interference to the cooperating network by jamming the power lines, intentionally or unintentionally, with interfering signals.

As time progresses, increasing number of intelligent devices may be communicating important command and control information, and private sensitive data, along the power lines. Furthermore, more and more of these intelligent devices may be located in close physical proximity, such as in neighboring homes, apartments and office buildings. No prior art has suggested a suitable method or device to separate communications transmitted along power lines into distinct physical communication domains, so that communications within one network may be secure and private from communications within another network.

SUMMARY OF THE INVENTION

To meet this and other needs, and in view of its purposes, the present invention provides a power line communications system including a power line for supplying ac power; a power source connected to the power line at one end; and a communications network having a plurality of devices, the devices connected to the power line at another end for (a) receiving ac power and (b) communicating information. The system also includes a security firewall coupled between the one end and the other end of the power line for securing the communications information. The security firewall passes the ac power but blocks the communications information. The security firewall also includes a band pass filter for communicating a signal having frequency contents within the band pass filter between the one end and the other end of the power line.

It is understood that the foregoing general description and the following detailed description are exemplary, but are not restrictive, of the invention.

BRIEF DESCRIPTION OF THE DRAWING

The invention is best understood from the following detailed description when read in connection with the accompanying drawing. Included in the drawing are the following figures.

DETAILED DESCRIPTION OF THE INVENTION

Figure 1:
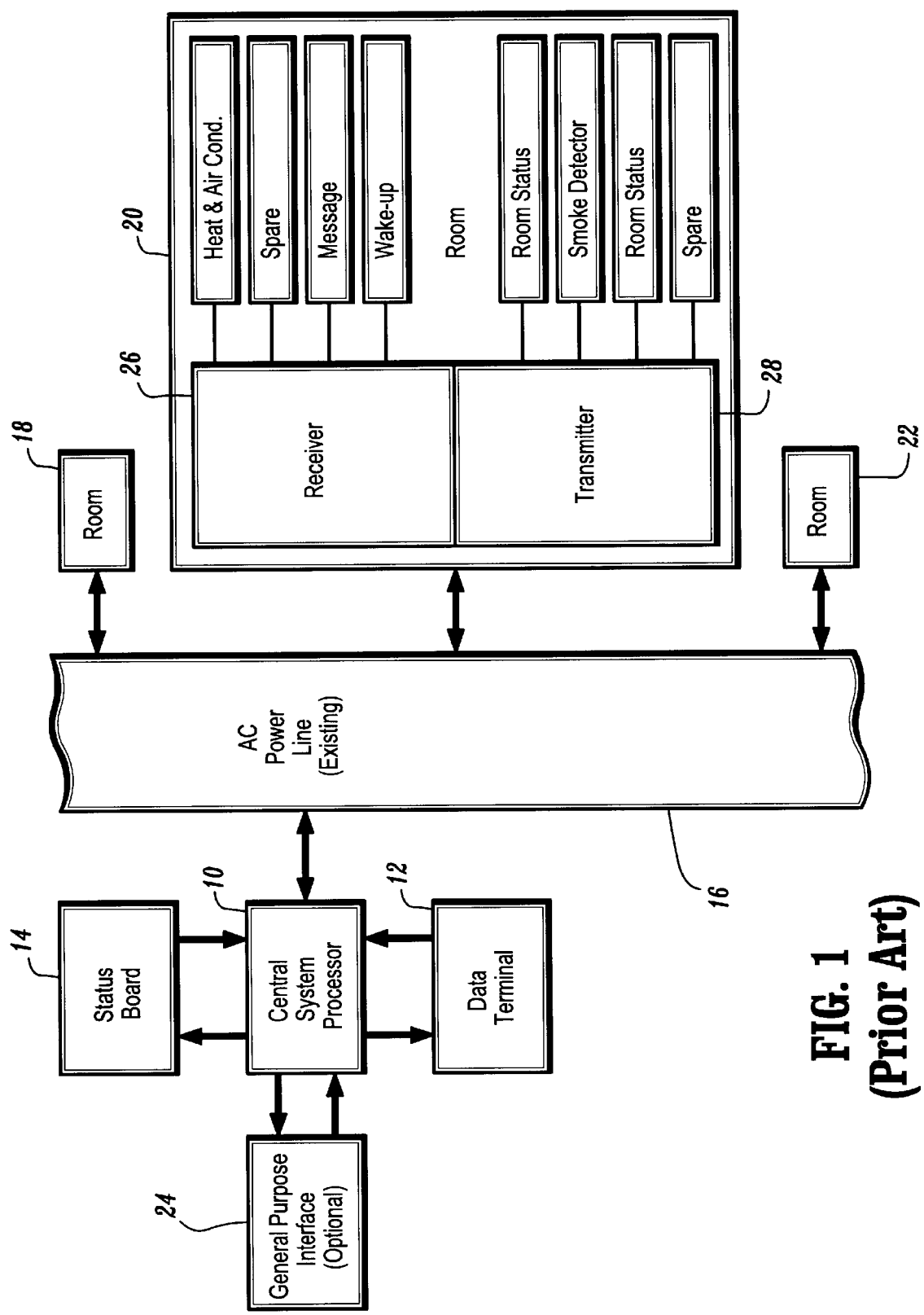
FIG. 1 is a block diagram of room status indication network of a conventional system incorporating ac power line communications.
Figure 2:
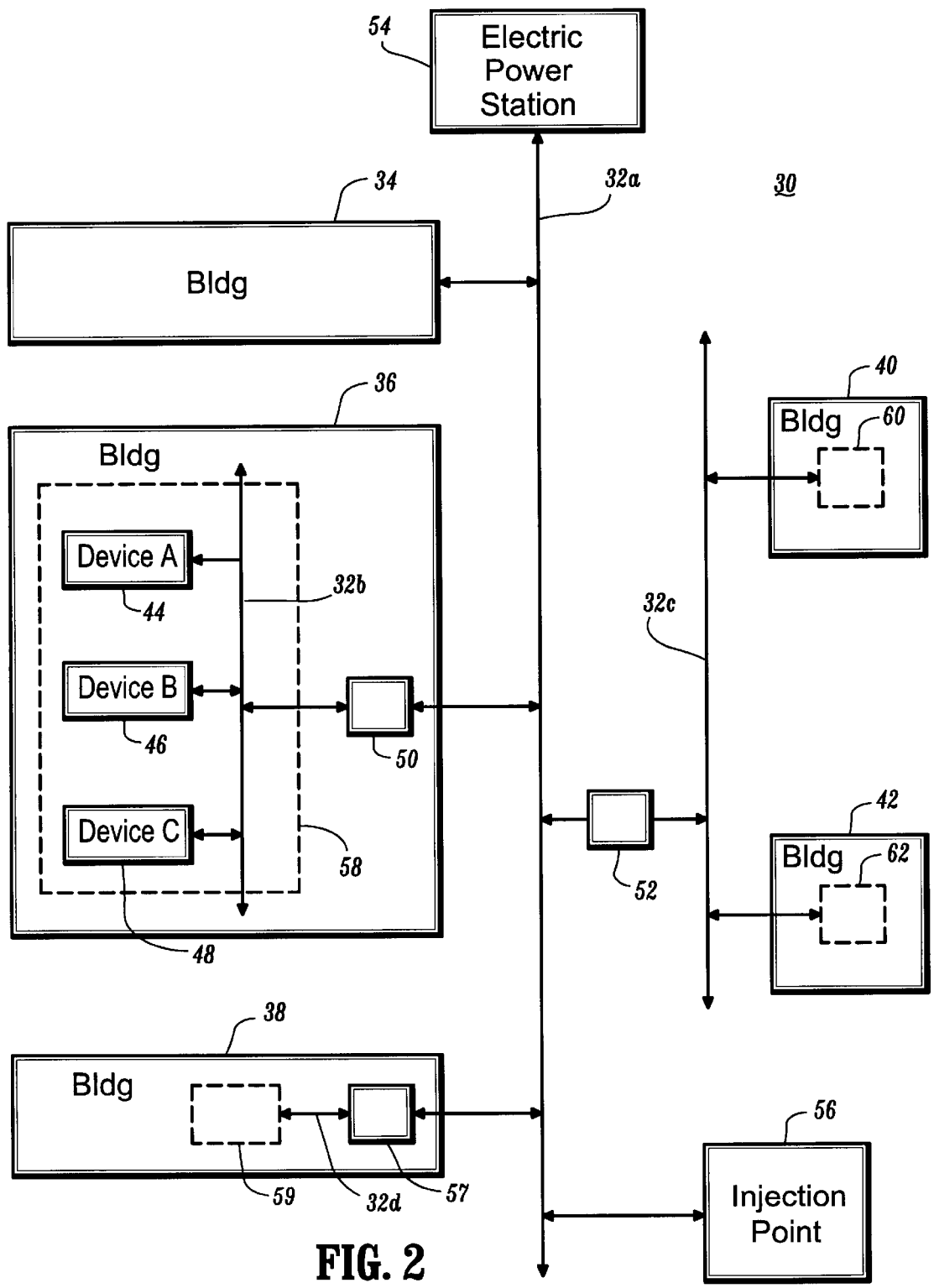
FIG. 2 is a block diagram of a power line communications system of the present invention.

Referring to FIG. 2, a power line communications system, constructed in accordance with the present invention, is generally designated by reference numeral 30. The power line communications system includes power line 32a, which distributes AC power from electric power station 54 between a plurality of buildings, generally designated 34, 36, 38, 40 and 42. The power line is, for example, a standard 50 Hz or 60 Hz distribution line providing a domestic electric power source of 120V/240V at a maximum current of 200 amperes for normal usage.

Voice and data signals may be communicated along the power line in any of the plurality of buildings. For example, building 36 includes network 58 communicating along power line 32b existing within the building. Power line 32b is shown connected to power line 32a by way of security firewall 50, which will be explained later. Network 58 includes a plurality of devices, including device-A 44, device-B 46 and device-C 48, as shown. Network 58 may include, for example, any one of the systems described in the U.S. patents incorporated by reference above. For example, device-A 44 may be a processor controlling and monitoring device-B 46 and device-C 48. As another example, device-A may be a speech processor transmitting speech data to device-B and device-C. As these devices communicate along power line 32b, they utilize a broad frequency spectrum that is above the 60 Hz frequency that is supplied from the electric power station. Frequencies below the communications frequency band may be attenuated by each device, thereby eliminating interference from the power line frequency of 60 Hz in the United States. Depending on the nature and character of the information being communicated within network 58, a frequency spectrum is utilized that is sufficiently wide to transmit and receive the communications information.

In order to prevent information being communicated within network 58 to leak out and be detected externally to power line 32b, a security firewall, generally designated as reference numeral 50, may be inserted, as shown in FIG. 2, between power line 32b and power line 32a. Security firewall 50 also prevents any interference from being injected from power line 32a into power line 32b. In this manner, security firewall 50 is effective in partitioning and isolating network 58, so that network 58 may operate securely, without external detection or interference.

Figure 3:
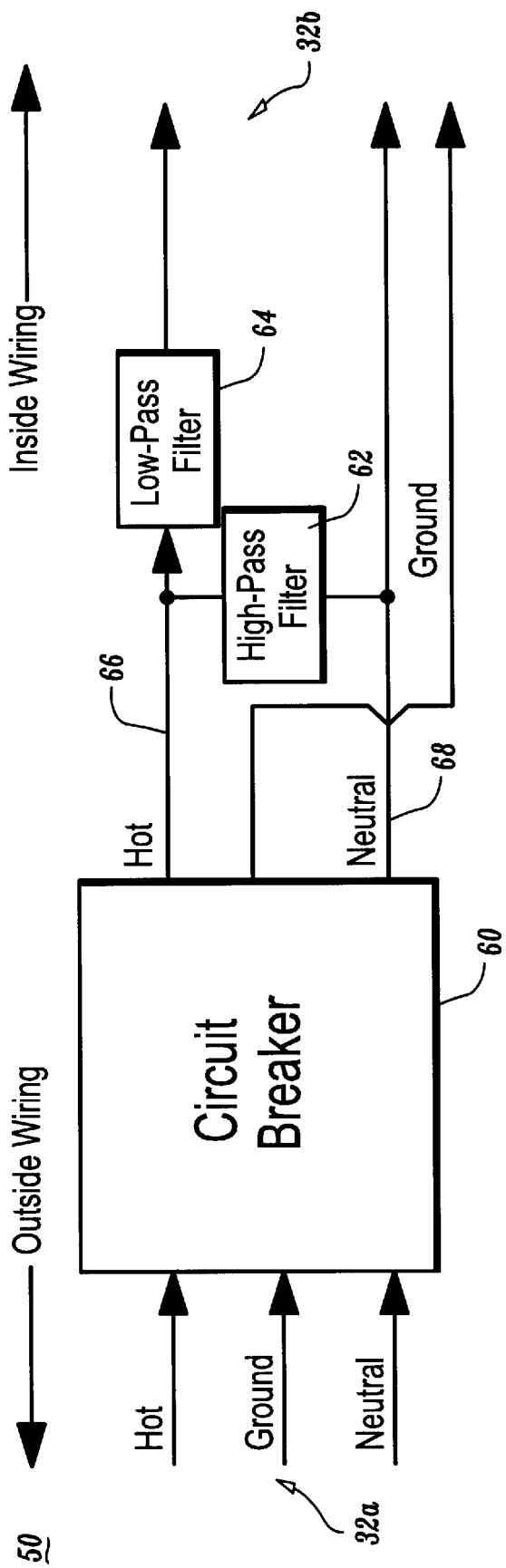
FIG. 3 is a block diagram of a security firewall of the power line communications system of the present invention.

An embodiment of security firewall 50 is illustrated in FIG. 3. As shown, coupled between power line 32a and power line 32b is circuit breaker 60, high pass filter 62 and low pass filter 64. Circuit breaker 60 may be a conventional circuit breaker placed within a building to permit electric current to flow between a hot wire 66 and a neutral wire 68. High pass filter 62 may be placed in parallel between hot wire 66 and neutral wire 68. Low pass filter 64 may be placed in series, or in-line, with hot wire 66.

As shown, low pass filter 64 permits the 60 Hz power frequency to pass without attenuation into the wires inside the building, or to power line 32b. High pass filter 62, on the other hand, blocks undesirable frequencies from entering power line 32b, thereby preventing interference from the external power line 32a and enabling interference-free communications within network 58. High pass filter 62 also prevents communication signals on power line 32b from exiting the building, thereby securing communications being conducted within network 58.

Figure 4:
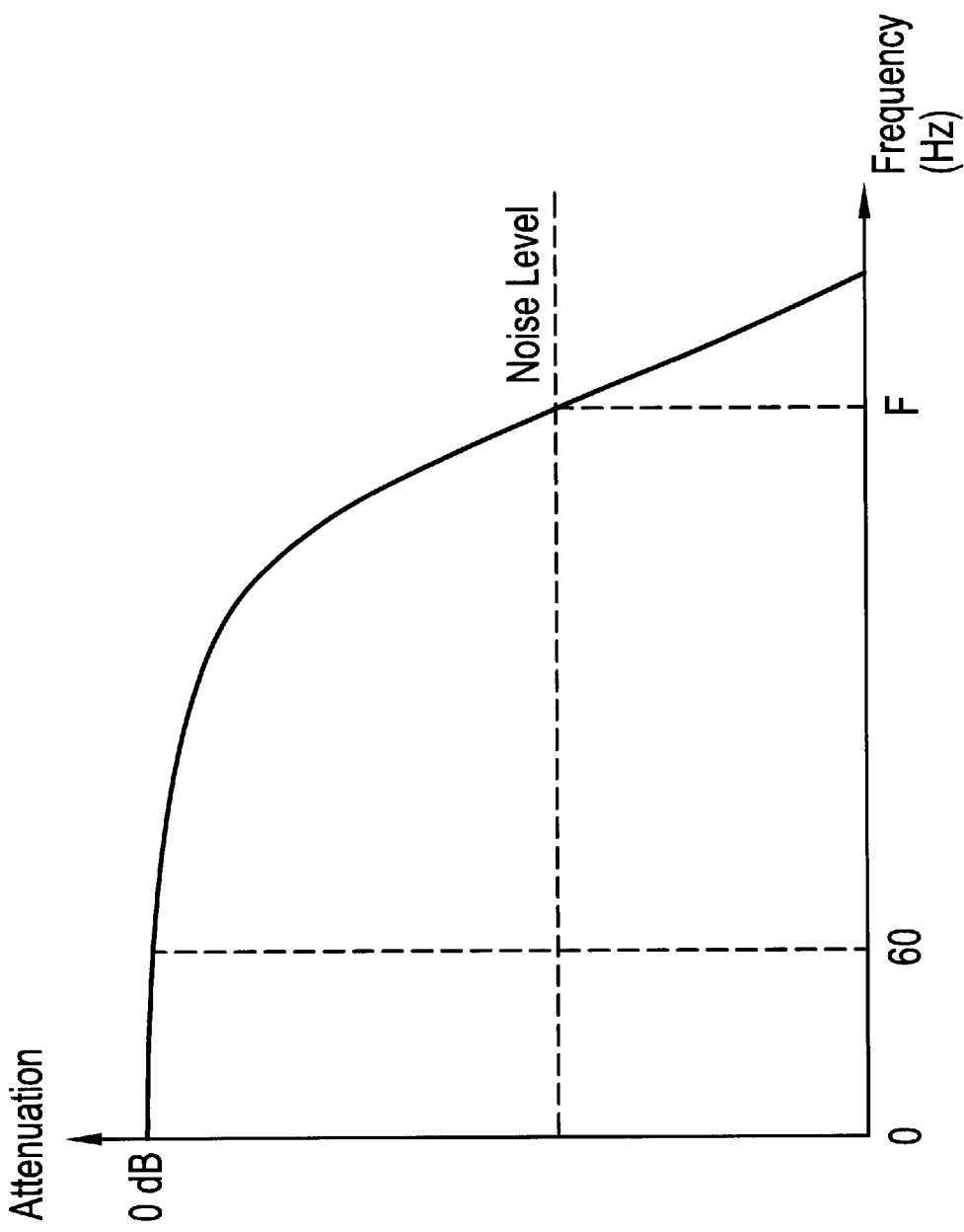
FIG. 4 is a plot of attenuation in dB versus frequency in Hz of the security firewall of the power line communications system of the present invention.

It will be appreciated that high pass filter 62 and low pass filter 64 may be any combination of one or more resistors (R), inductors (L) and capacitors (C) formed by an RLC circuit to pass, without attenuation, electric power frequencies of 60 Hz, but attenuate frequencies above 60 Hz that are used for communications within network 58. An example of the attenuation characteristics as a function of frequency of the RLC circuit is shown in FIG. 4. The figure shows a plot of attenuation in dB versus frequency in Hz of the RLC circuit in security firewall 50. As shown, filtering permits 60 Hz to pass without attenuation on both ends of security firewall 50, outside and inside the building, and along power line 32a and power line 32b. Frequencies above 60 Hz, however, that may be used for communications within network 58 are attenuated to a level below the signal noise level outside network 58.

For example, as shown in FIG. 4, any frequency above "F" is attenuated to a level below the signal noise level. It will be appreciated that "F" may be selected to lie below a predetermined frequency band utilized for communications. If digital communications are used by network 58, for example, with an operating frequency band between 500 Hz and 20,000 Hz, "F" may be selected as a frequency above 120 Hz (first harmonic of the power frequency) but below 400 Hz (100 Hz margin from the operating frequency band).

In another example, operating frequencies between 1 MHz and 60 MHz may be used, as described by P. A. Brown in U.S. Pat. No. 5,684,450, which is incorporated herein for its teachings of communication frequencies along power lines. In this example, cutoff frequency "F" may be selected as any frequency below 1 MHz, but above 60 Hz.

It will be appreciated that high pass filter 62 and low pass filter 64 may be packaged integrally with conventional circuit breaker 60. In this manner, a building may be protected from electric power surges and from unauthorized detection of, or interference to a network by a single package containing security firewall 50. Because of the small size of an RLC circuit and because of standardization in the dimensions of household and office building circuit breakers, the RLC circuit may be incorporated integrally with the circuit breaker electronics in a standard size package. Furthermore, in most situations, the RLC circuit may be a single, small coil coupled in-line with the hot wire, or a single, small capacitor coupled across the hot wire and the neutral wire.

In another embodiment, FIG. 2 shows security firewall 52 connected between power line 32a and power line 32c, the latter distributing power to buildings and 42. Power line 32c is also shown providing a medium for communications between two networked systems, designated generally as 60 and 62. Networks 60 and 62 are shown as located in separate buildings, but may be similar to network 58 of building 36. Security firewall 52 may omit circuit breaker 60, shown in FIG. 3, but include high pass filter 62 and low pass filter 64. In this manner, the communications spectrum emanating from building 42 along power line 32c may be permitted to pass without attenuation to building 40. That same frequency spectrum, however, may be blocked from passing to power line 32a by high pass filter 62 of security firewall 52. Similarly, interference signals along power line 32a may be blocked by high pass filter 62, without affecting communications along power line 32c. While high pass filter 62 isolates communications along power line 32c, low pass filter 64 may allow the 60 Hz power signal to flow without attenuation from power line 32a to power line 32c. Thus, security firewall 52 may have frequency characteristics that are similar to those of security firewall 50, as shown in FIG. 4.

In yet another embodiment, FIG. 2 shows security firewall 57 coupled between power line 32d and power line 32a. Power line 32d is shown as a communications medium inside building 38 for network 59. In a similar manner, network 59 may contain a plurality of devices, as shown for network 58. In this embodiment, however, it may be desirable to have a frequency window for injecting a communications signal from injection point 56, along power line 32a and power line 32d, into network 59. In order to permit passage of the injected signal, security firewall 57 may include not only the high pass and low pass filters, described in the other embodiments, but may also include a band pass filter. The band pass filter may be positioned appropriately in frequency to permit the injected signal to pass without attenuation.

Figure 5:
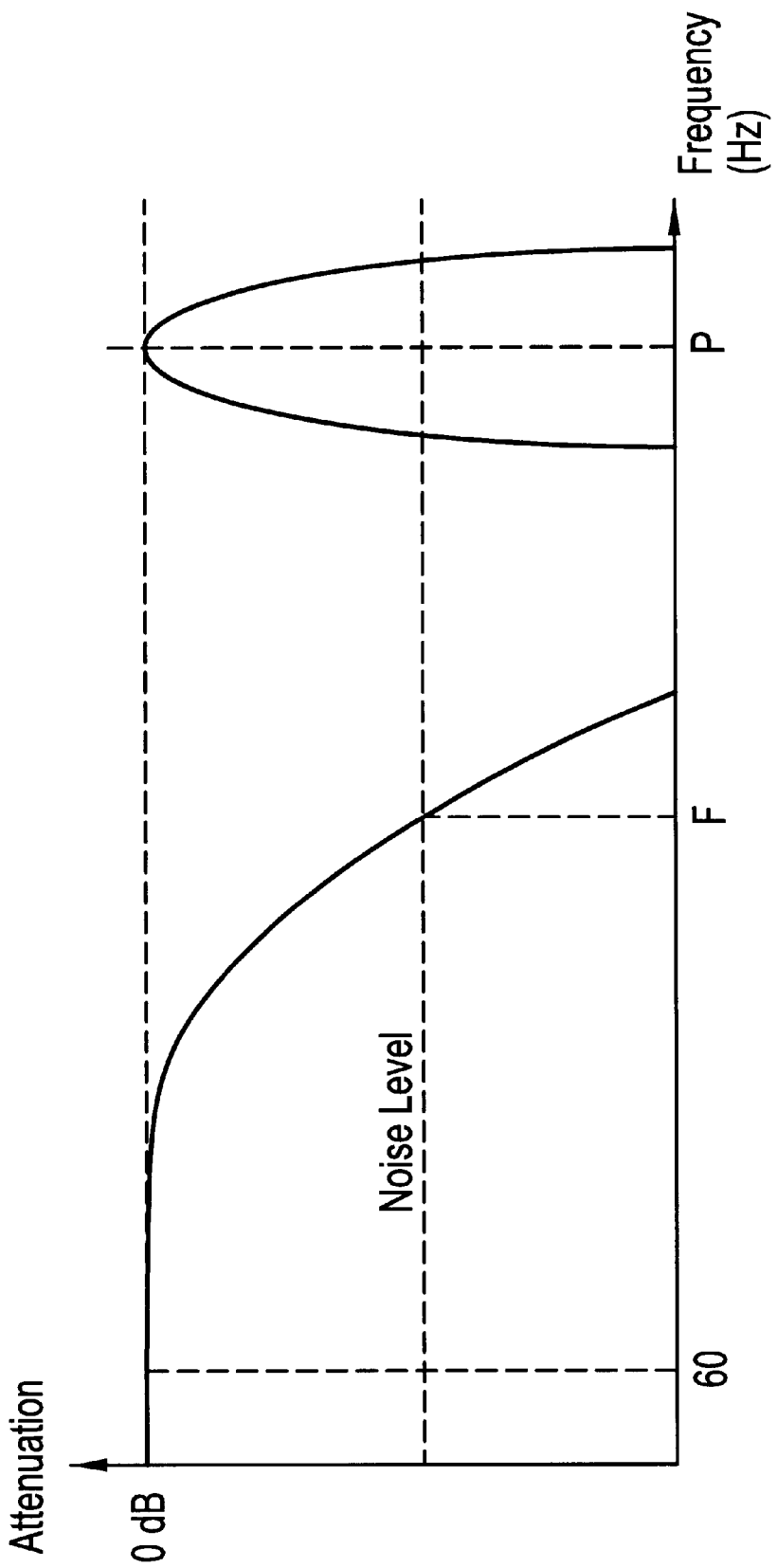
FIG. 5 is a plot of attenuation in dB versus frequency in the Hz of another embodiment of the security firewall of the power line communications system of the present invention.

For example, security firewall 57 may have an RLC circuit with frequency characteristics shown in FIG. 5. Thus, the RLC circuit may have the same frequency characteristics as security firewall 50 (shown in FIG. 4), and a band pass filter configured to pass without attenuation the injected signal centered at a frequency "P", for example. Frequency "P" may be any available frequency, preferably one that is not used for internal communications by the networks shown in FIG. 2. While the injection signal described assumed that a signal is injected from injection point 56 into network 59, the opposite may also be possible. That is, a signal, centered at a frequency "P", may be transmitted from network 59 to a point external to building 38 by way of security firewall 57.

Although illustrated and described herein with reference to certain specific embodiments, the present invention is nevertheless not intended to be limited to the details shown. Rather, various modifications may be made in the details within the scope and range of equivalents of the claims and without departing from the spirit of the invention. It will be understood, for example, that the present invention is not limited to a security firewall placed at the entrance of the power line into a building, but may include a security firewall positioned to block communications from one room to another room within a building. Furthermore, the security firewall may be implemented with filtering characteristics that are different from those shown in FIGS. 4 and 5. For example, two band pass filters may be added to allow injection of two different bands of frequencies.

What is claimed:

1. A power line communications system comprising:
    a power line for supplying ac power;
    a power source connected to said power line at one end;
    a communications network having a plurality of devices, said devices connected to said power line at another end for (a) receiving said ac power and (b) communicating information, and
    a securing firewall coupled between said one end and said other end of said power line for securing said information, wherein said security firewall includes a band pass filter for communicating a signal having frequency contents within said band pass filter between said one end and said other end.

2. The system of claim 1 wherein said security firewall passes said ac power and blocks said information between said one end and said other end.

3. The system of claim 2 wherein said information includes signals in a frequency band above an ac frequency of said power source, and
    said security firewall passes said ac frequency and blocks said signals in said frequency band.

4. The system of claim 3 wherein said security firewall includes a high pass filter for blocking said signals in said frequency band, and
    a low pass filter for passing said ac frequency.

5. The system of claim 4 wherein said power line includes at least two conductors, and
    said low pass filter is connected in line with one of said conductors and said high pass filter is connected across said two conductors.

6. The system of claim 5 wherein said security firewall includes a circuit breaker formed integrally with said high pass and low pass filters.

7. The system of claim 6 wherein said security firewall has a pass frequency band utilized for communication.

8. The system of claim 1 wherein said band pass filter of said security firewall has a high pass, a low pass and a band pass frequency bands utilized for communication.

9. The system of claim 5 wherein said high pass and low pass filters include a combination of at least one component selected from a group of components including resistors, capacitors and inductors.

10. In a system using an electrical power line for providing (a) power at an ac frequency and (b) communications over a frequency band to a plurality of devices in a building, wherein the frequency band of communications has a frequency value above the ac power frequency, a method of securing the communications comprising the steps of:

a) low pass filtering between a power line section inside the building and a power line section outside the building;
b) high pass filtering between the power line section inside the building and the power line section outside the building; and
c) band pass filtering between the power line section inside the building and the power line section outside the building.

11. The method of claim 10 wherein the low pass filter passes the ac frequency of the power and blocks communications over the frequency band between the power line section inside the building and the power line section outside the building.

12. The method of claim 11 wherein the band pass filter allows communications of frequencies in the band pass between the power line section inside the building and the power line section outside the building.

13. The method of claim 11 including the step of
d) disposing the low pass and high pass filters adjacent a circuit breaker for the power line section inside the building.

14. The method of claim 13 including the step of
e) disposing the circuit breaker integrally with the low pass and high pass filters.

* * * * *